US012589634B2

(12) United States Patent
Ju et al.

(10) Patent No.: US 12,589,634 B2
(45) Date of Patent: Mar. 31, 2026

(54) AIR CONDITIONER FOR VEHICLE

(71) Applicant: Hanon Systems, Daejeon (KR)

(72) Inventors: Jae Yeong Ju, Daejeon (KR); Jun Chul An, Daejeon (KR); Jung Ho Lee, Daejeon (KR); Jin Hyeong Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 369 days.

(21) Appl. No.: 18/383,064

(22) Filed: Oct. 24, 2023

(65) Prior Publication Data

US 2024/0157767 A1    May 16, 2024

(30) Foreign Application Priority Data

Nov. 15, 2022    (KR) ........................ 10-2022-0152635

(51) Int. Cl.
| | | |
|---|---|---|
| *B60H 1/34* | (2006.01) | |
| *B60H 1/00* | (2006.01) | |
| *F16H 1/04* | (2006.01) | |
| *F16H 19/00* | (2006.01) | |
| *F16H 55/17* | (2006.01) | |
| *F16H 57/00* | (2012.01) | |

(52) U.S. Cl.
CPC .................................. *B60H 1/3414* (2013.01)

(58) Field of Classification Search
CPC ............ B60H 1/00664; B60H 1/00678; B60H 1/00857; B60H 1/3414; B60H 1/3421; F16H 55/17; F16H 1/04; F16H 19/001; F16H 57/00
See application file for complete search history.

(56) References Cited

U.S. PATENT DOCUMENTS

| | | | | |
|---|---|---|---|---|
| 2,862,400 A | * | 12/1958 | Angelo ................... | F16H 55/17 104/29 |
| 2014/0000397 A1 | * | 1/2014 | Nolta, Jr. ........... | B60H 1/00857 74/393 |

FOREIGN PATENT DOCUMENTS

| | | | | | |
|---|---|---|---|---|---|
| DE | 102020113039 A1 | * | 2/2021 | ............. | F16H 55/17 |
| DE | 202022101970 U1 | * | 4/2022 | ........... | F16H 57/023 |
| JP | 5614963 B2 | | 10/2014 | | |
| JP | 2015-110404 A | | 6/2015 | | |
| JP | 2021062726 A | | 4/2021 | | |

OTHER PUBLICATIONS

DE102020113039 and translation (Year: 2021).*
DE202022101970 and translation (Year: 2022).*
English translation of Official Action issued Feb. 24, 2026 in related Korean Patent Application No. 10-2022-0152635, 11 pgs.

* cited by examiner

*Primary Examiner* — Steven S Anderson, II
(74) *Attorney, Agent, or Firm* — NORTON ROSE FULBRIGHT US LLP

(57) ABSTRACT

The present disclosure provides an air conditioner for a vehicle including a door disposed inside an air conditioning case and configured to adjust an opening degree of an air flow path including a first gear and a second gear coupled to the door or door driving components, wherein the first gear and the second gear include a first tooth and a second tooth meshing with each other, the first gear includes a rib protruding in an axial direction and a first cover disposed above the first tooth, and the second gear includes a first groove into which the rib is inserted and a second groove into which the first cover is inserted.

14 Claims, 11 Drawing Sheets

AIR CONDITIONER FOR VEHICLE

CROSS-REFERENCE TO RELATED APPLICATION

This application claims priority to and the benefit of Korean Patent Application No. 10-2022-0152635, filed on Nov. 15, 2022, the disclosure of which is incorporated herein by reference in its entirety.

BACKGROUND

Field of the Invention

The present disclosure relates to an air conditioner for a vehicle.

Discussion of Related Art

An evaporator and a heater may be disposed inside an air conditioning case of an air conditioner. Air is cooled while passing through the evaporator, and air is heated while passing through the heater.

Doors for adjusting an opening degree of an air flow path may be disposed inside the air conditioning case.

An air inlet is formed at an inlet of the air conditioning case, and vents of which opening degrees are adjustable are disposed at an outlet thereof. A blower is connected to the air inlet of the air conditioning case and blows inside air or outside air.

An air conditioner for a vehicle includes an actuator for moving the door. The actuator and a shaft may be connected by a cam and gears connecting the cam to the shaft of the door.

When these gears for moving the door are assembled, the gears have a risk of misassembly in which the gears are not engaged at the center thereof and are biased to one side. Although a rib is disposed on a central portion of the gear in order to prevent the misassembly, there is a problem in that two gears to be engaged may not be aligned with the rib and are engaged by being biased to one side to avoid the rib in many cases. In addition, although it is possible to prevent the misassembly by tying some of teeth of the gear, there is a problem in that backlash greatly occurs in the gears due to the tied portion of the teeth.

RELATED ART DOCUMENT

Patent Document 1: Japanese Patent Application Laid-Open No. 2015-110404 published on Jun. 18, 2015.

SUMMARY OF THE INVENTION

In order to solve these problems, the present disclosure is directed to providing an air conditioner for a vehicle capable of preventing misassembly of gears connecting an actuator to a door and preventing foreign substances from flowing into an area in which the gears are engaged.

The object of the present disclosure is not limited to the above-described object, and other objects that are not mentioned will be able to be clearly understood by those skilled in the art from the following description.

Embodiments provide an air conditioner for a vehicle including a door disposed inside an air conditioning case and configured to adjust an opening degree of an air flow path, the air conditioner including a first gear and a second gear coupled to the door or door driving components, wherein the first gear and the second gear include a first tooth and a second tooth meshing with each other, the first gear includes a rib protruding in an axial direction and a first cover disposed above the first tooth, and the second gear includes a first groove into which the rib is inserted and a second groove into which the first cover is inserted.

The second gear may include a second cover covering the first cover.

The first cover and the second cover may be disposed to overlap each other in the axial direction.

The second cover may be disposed to be spaced apart from the first cover in the axial direction.

The second cover may include a hole passing through one surface and the other surface thereof in the axial direction, and the hole may be disposed only in a section overlapping the first cover.

The first tooth may be formed to extend from the first cover.

The first tooth in the second area may be in contact with the first cover in the axial direction.

The second tooth in a fourth area may be disposed to be spaced apart from the second cover in the axial direction.

An end of the second cover may be disposed to protrude further than the second tooth in a radial direction.

The second cover may include a hole passing through one surface and the other surface thereof in the axial direction.

The hole may be disposed to overlap the second tooth in the axial direction.

The second cover may be disposed to overlap the first tooth in the axial direction.

A length of the second tooth in the axial direction may be smaller than a length of the first tooth in the axial direction in a second area.

The rib may be disposed to protrude further than the first cover in the axial direction.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY
EMBODIMENTS

Hereinafter, exemplary embodiments according to the present disclosure will be described in detail with reference to the accompanying drawings.

However, the technical spirit of the present disclosure is not limited to some of the described embodiments, but may be implemented in various different forms, and one or more of the components among the embodiments may be used by being selectively coupled or substituted without departing from the scope of the technical spirit of the present disclosure.

In addition, terms (including technical and scientific terms) used in embodiments of the present disclosure may be construed as meaning that may be generally understood by those skilled in the art to which the present disclosure pertains unless explicitly specifically defined and described, and the meanings of the commonly used terms, such as terms defined in a dictionary, may be construed in consideration of contextual meanings of related technologies.

In addition, the terms used in the embodiments of the present disclosure are for describing the embodiments and are not intended to limit the present disclosure.

In the specification, a singular form may include a plural form unless otherwise specified in the phrase, and when described as "at least one (or one or more) of A, B, and C," this may include one or more among all possible combinations of A, B, and C.

In addition, terms such as first, second, A, B, (a), and (b) may be used to describe components of the embodiments of the present disclosure.

These terms are only for the purpose of distinguishing one component from another component, and the nature, sequence, order, or the like of the corresponding components is not limited by these terms.

In addition, when a first component is described as being "connected," "coupled," or "joined" to a second component, it may include not only a case in which the first component is directly connected, coupled, or joined to the second component, but also a case in which the first component is "connected," "coupled," or "joined" to the second component with a third component present between the first component and the second component.

In addition, when a first component is described as being formed or disposed on "on (above) or below (under)" a second component, "on (above)" or "below (under)" may include not only a case in which two components are in direct contact with each other, but also a case in which one or more third components are formed or disposed between the two components. In addition, when described as "on (above) or below (under)," it may include the meaning of not only an upward direction but also a downward direction based on one component.

Figure 1:
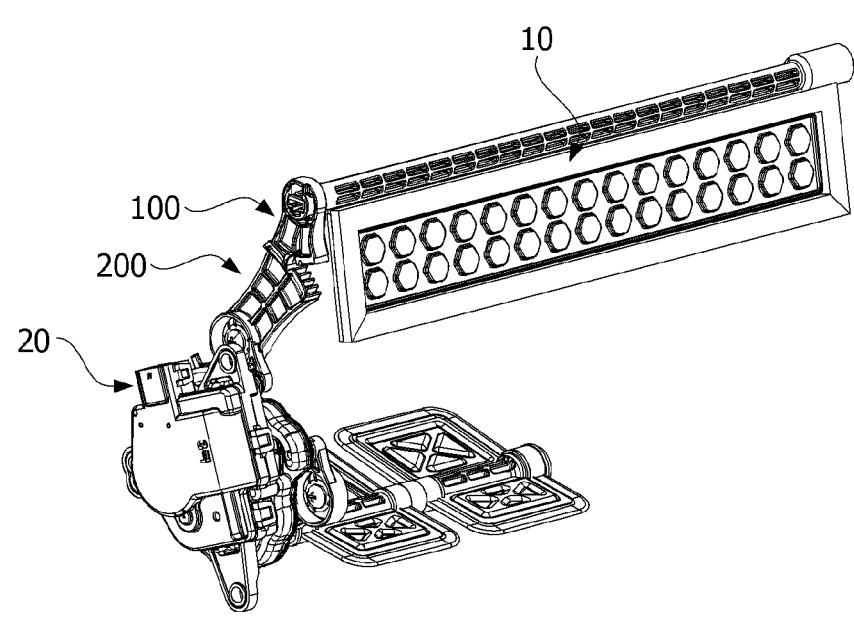
FIG. 1 is a perspective view illustrating a door, an actuator, and a gear of an air conditioner for a vehicle according to an embodiment.

FIG. 1 is a perspective view illustrating a door, an actuator, and a gear of an air conditioner for a vehicle according to an embodiment.

Referring to FIG. 1, an air conditioner for a vehicle according to the embodiment includes a door 10 for adjusting an opening degree of an air flow path inside an air conditioning case and an actuator 20 for moving the door 10. The door 10 and the actuator 20 are connected through gears. The gears may include a first gear 100 and a second gear 200. The first gear 100 is connected to a shaft of the door 10. The second gear 200 may be connected to a cam connected to the actuator 20.

An axial direction of the first gear 100 and an axial direction of the second gear 200 may be disposed in parallel. The first gear 100 and the second gear 200 are arc-shaped gears.

Hereinafter, an axial direction is the axial direction of the first gear 100 or the axial direction of the second gear 200, and a circumferential direction is a direction based on the axial direction of the first gear 100 or a direction based on the axial direction of the second gear 200.

The first gear 100 and the second gear 200 are assembled in the axial direction, and when the first gear 100 and the second gear 200 are assembled, it is important that the first gear 100 and the second gear 200 are assembled after center areas thereof are aligned in the circumferential direction to adjust an opening angle of the door 10.

Figure 2:
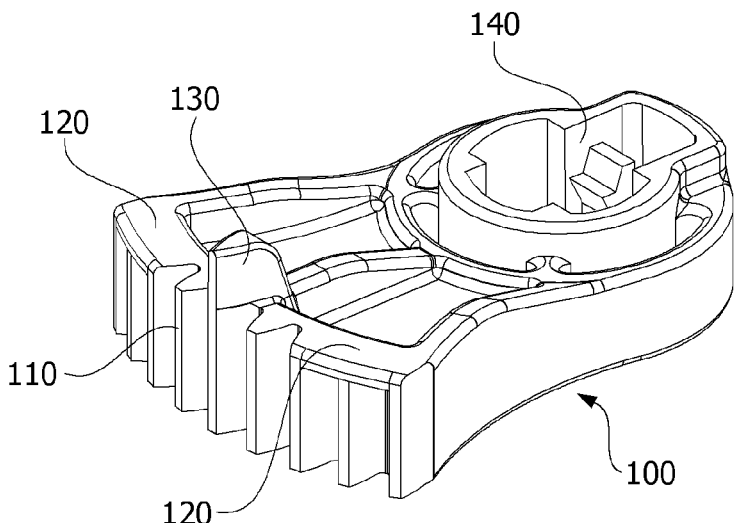
FIG. 2 is a perspective view illustrating a first gear.
Figure 3:
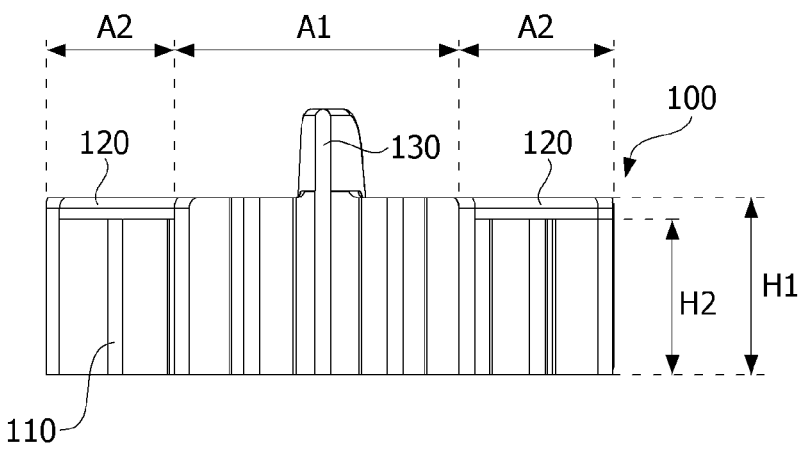
FIG. 3 is a front view of the first gear illustrated in FIG. 2.
Figure 4:
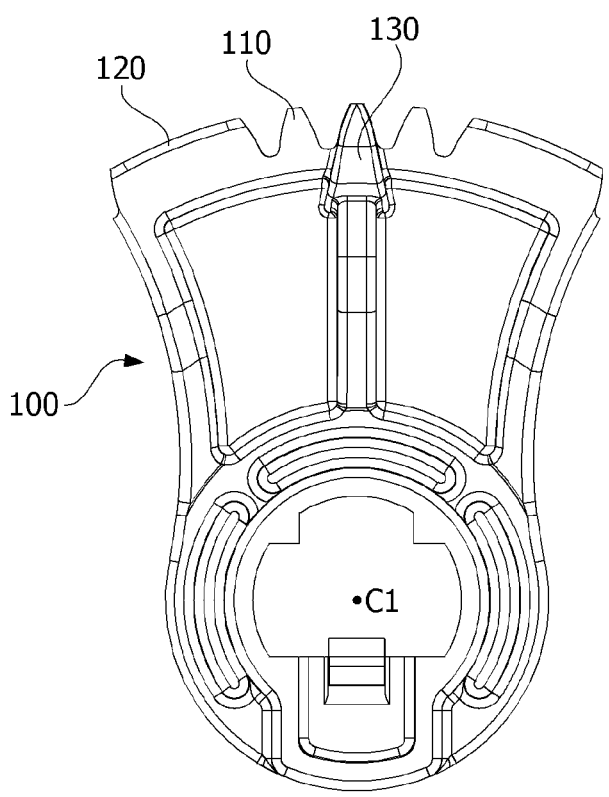
FIG. 4 is a plan view of the first gear illustrated in FIG. 2.

FIG. 2 is a perspective view illustrating the first gear 100, FIG. 3 is a front view of the first gear 100 illustrated in FIG. 2, and FIG. 4 is a plan view of the first gear 100 illustrated in FIG. 2.

Referring to FIGS. 2 to 4, the first gear 100 rotates about an axial center C1. The first gear 100 is coupled to the shaft of the door 10. The axial center C1 of the first gear 100 may be parallel or coincident with an axial center of the door 10. The first gear 100 includes a first tooth 110 disposed along an arc trajectory, a first cover 120 covering the first tooth 110, and a fastening hole 140 through which the shaft of the door 10 is coupled.

The first gear 100 may be divided into a first area A1 and a second area A2 in an area in which the first tooth 110 is positioned. The first area A1 is an area in which a second tooth 210 of the second gear 200 is inserted, and the second area A2 is an area other than the first area A from the area in which the first tooth 110 is positioned. The first area A1 is positioned in the middle of the first gear 100 in the circumferential direction, and each of the second areas A2 is disposed at one of both sides of the first area A1 based on the circumferential direction. Therefore, when the second gear 200 is inserted into the first area A1 in the axial direction, the first gear 100 and the second gear 200 may be assembled after aligned in the middle in the circumferential direction. Since the first gear 100 and the second gear 200 are arc-shaped gears, the alignment of the first gear 100 and the second gear 200 in the middle in the circumferential direction is a very important factor to adjust the opening angle of the door 10.

The first cover 120 is disposed in the second area A2. The first cover 120 may be formed in a shape that connects one side end portions of the first tooth 110 disposed in the second area A2 in the axial direction. Therefore, the first cover 120 and the first tooth 110 disposed in the second area A2 are in a state of being in contact with each other. Due to the first cover 120, one side end of the first tooth 110 in the axial direction is in a state of being closed. On the other hand, one side end of the first tooth 110 disposed in the first area A1 in the axial direction without the first cover 120 is open. Therefore, when the first gear 100 and the second gear 200 are initially assembled, the first gear 100 and the second gear 200 may be inserted between the second tooth 210 of the second gear 200 and the first tooth 110 through the first area A1.

The first cover 120 plays two roles.

First, During the initial assembly, the second gear 200 is physically prevented from being inserted in the second area A2. When the second gear 200 is inserted into the first gear 100 in the axial direction, the second tooth 210 of the second gear 200 is blocked by the first cover 120, and thus it is possible to fundamentally prevent the misassembly of the first gear 100 and the second gear 200.

Second, it is possible to prevent foreign substances from being introduced between the first teeth 110 of the first gear 100. Since the first cover 120 covers the first tooth 110, it is possible to physically prevent foreign substances from being introduced between the first teeth 110.

Due to the first cover 120, a length H1 of the first tooth 110 in the first area A1 and a length H2 of the first tooth 110 in the second area A2 may be different.

For example, the length H1 of the first tooth 110 in the first area A1 is larger than the length H2 of the first tooth 110 in the second area A2. The length H1 of the first tooth 110 in the first area A1 may be larger than the length H2 of the first tooth 110 in the second area A2 as much as a thickness of the first cover 120 in the axial direction.

Meanwhile, the first gear 100 may include a rib 130 for preventing misassembly. The rib 130 protrudes from the first area A1 in the axial direction. The rib 130 may be positioned at the center in the circumferential direction based on the axial center of the first gear 100. A cross section of the rib 130 may be formed to correspond to a tooth shape of the second tooth 210.

The ribs 130 may be disposed to protrude further than the first cover 120 in the axial direction.

Figure 5:
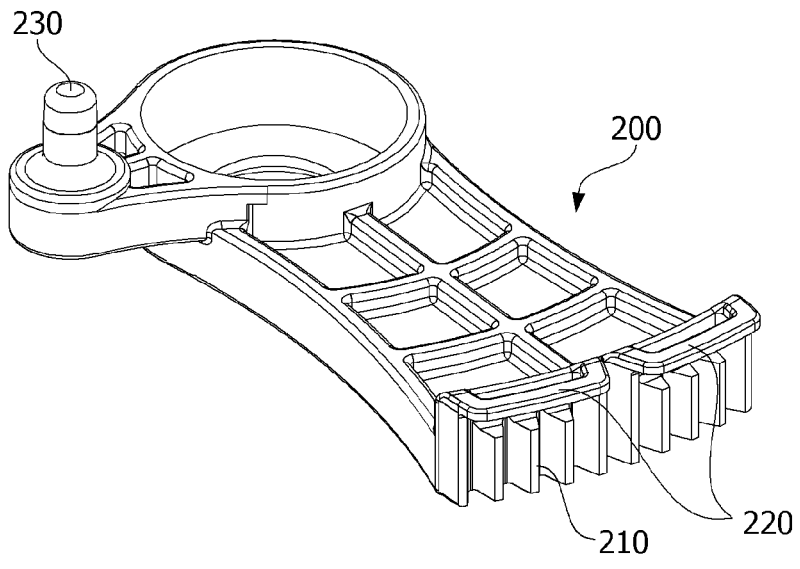
FIG. 5 is a perspective view illustrating a second gear.
Figure 6:
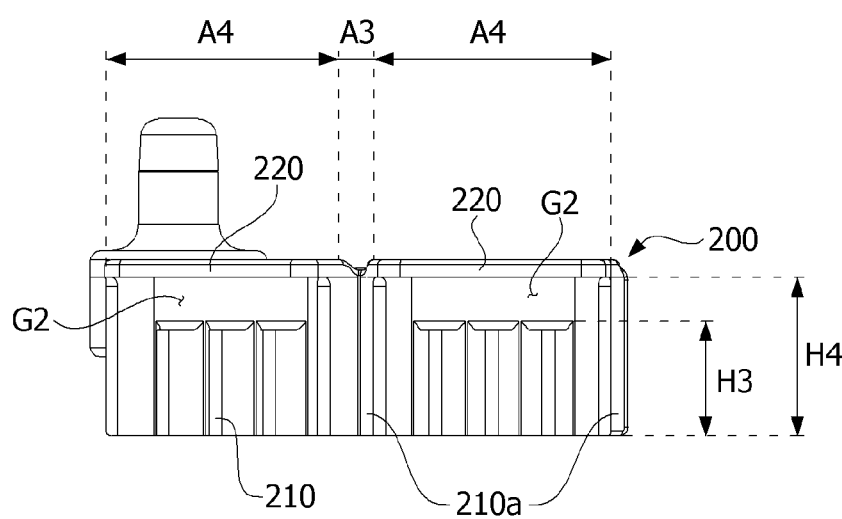
FIG. 6 is a front view of a second gear illustrated in FIG. 5.
Figure 7:
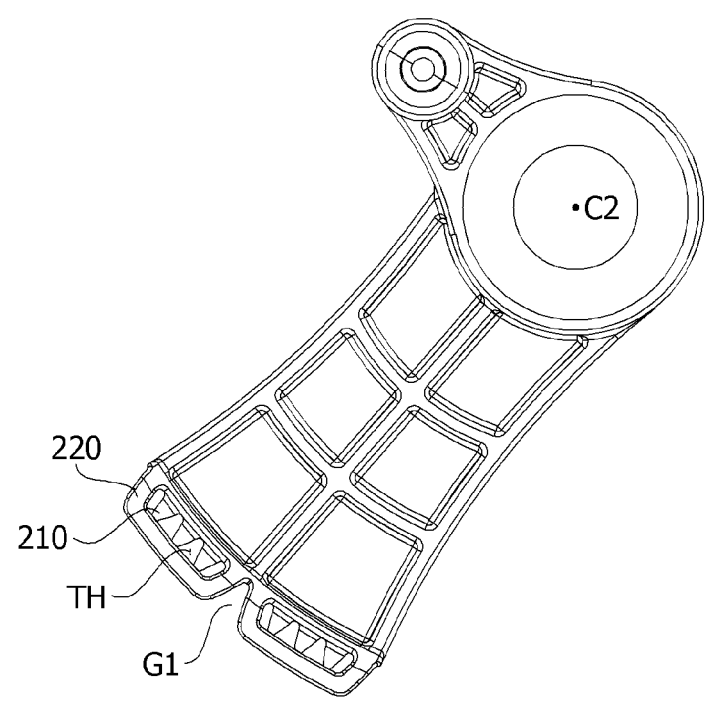
FIG. 7 is a plan view of the second gear illustrated in FIG. 5.

FIG. 5 is a perspective view illustrating the second gear 200, FIG. 6 is a front view of the second gear 200 illustrated in FIG. 5, and FIG. 7 is a plan view of the second gear 200 illustrated in FIG. 5.

Referring to FIGS. 5 to 7, the second gear 200 rotates about an axial center C2. The second gear 200 may be connected to the cam connected to the actuator 20. The axial center C2 of the second gear 200 may be parallel with the axial center of the door 10. In addition, the axial center C2 of the second gear 200 is parallel to the axial center C1 of the first gear 100. The second gear 200 includes the second tooth 210 disposed along an arc trajectory and a second cover 220 covering the second tooth 210.

The second gear 200 may be divided into a third area A3 and a fourth area A4 in an area in which the second tooth 210 is positioned. The third area A3 is an area in which the rib 130 of the second gear 200 is inserted, and the fourth area A4 is an area other than the third area A3 from the area in which the second tooth 210 is positioned. The third area A3 is positioned in the middle of the second gear 200 in the circumferential direction, and each of the fourth areas A4 is disposed at one of both sides of the third area A3 based on the circumferential direction. Therefore, when the rib 130 is inserted into the third area A3, the first gear 100 and the second gear 200 may be assembled by being aligned in the middle in the circumferential direction. When the second gear is viewed from the axial direction, a V-shaped first groove G1 is formed in the third area A3 so that the rib 130 of the first gear 100 may be inserted.

The second cover 220 is disposed in the fourth area A4. The second cover 220 may be formed in a shape that connects two relatively long second teeth 210a among a plurality of second teeth 210 disposed in the fourth area A4. Therefore, the second teeth 210 except for the two second teeth 210a connected to the second cover 220 are disposed to be spaced apart from the second cover 220 in the axial direction.

A length H4 of the two second teeth 210a disposed at both ends among the plurality of second teeth 210 may be formed larger than a length H3 of the other second teeth 210 in the axial direction, and the second cover 220 may be connected to the two second teeth 210. Second grooves G2 are disposed above the two second teeth 210. The second groove G2 is a portion in which the tooth is not formed and is a portion in which the first cover 120 is inserted when the first gear 100 and the second gear 200 are engaged. The first cover 120 is inserted into the second groove G2 and disposed to overlap a hole TH of the second cover 220 in the axial direction. The first cover 120 positioned in the second groove G2 prevents foreign substances that may be introduced through the hole TH from flowing into the first tooth 110.

The second cover 220 can prevent foreign substances from being introduced from one side end of the second tooth 210 in the axial direction.

The second cover 220 is disposed to overlap the first tooth 110 of the first gear 100. Therefore, in a state in which the first gear 100 and the second gear 200 are engaged, when the first gear 100 moves in the axial direction, the first gear 100 is blocked by the second cover 220. Therefore, the second cover 220 can physically prevent the first gear 100 from being separated from the second gear 200.

The second cover 220 may include the hole TH passing through one surface and the other surface thereof in the axial direction. The hole TH may be disposed to overlap the second tooth 210 in the axial direction. Specifically, when viewed in the axial direction, the hole TH may be formed larger than the second tooth 210 so that all of the second teeth 210 are visible without covering some of the second teeth 210. In addition, the hole TH may be formed in only a section that overlaps the first cover 120.

In addition, the hole TH may be formed such that all of the second teeth 210 excluding the second teeth 210 to which the second cover 220 is connected are visible in the axial direction. The hole TH may be a structure formed in a process of injection-molding the second gear 200.

The length H3 of the second tooth 210 in the axial direction except for the second teeth 210a to which the second cover 220 is connected may be smaller than the length H2 of the first tooth 110 in the axial direction in the second area A2.

Figure 8:
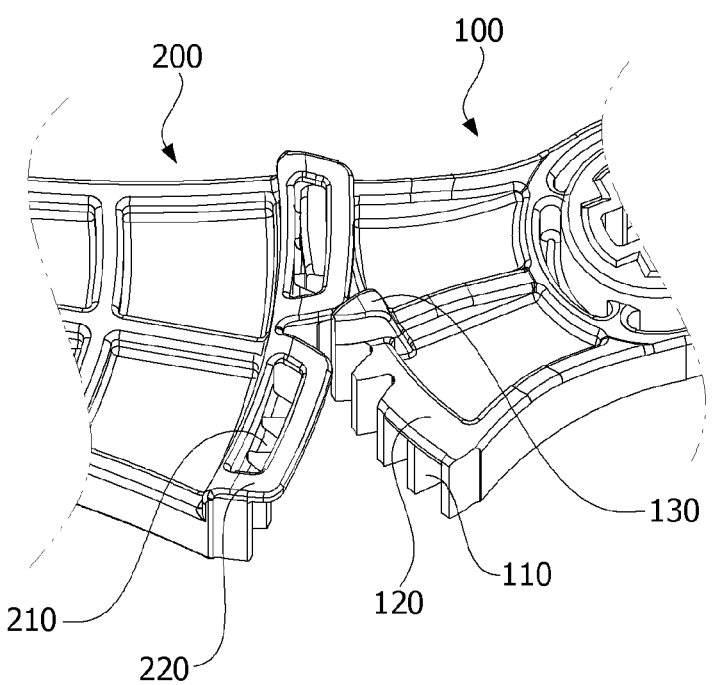
FIG. 8 is a view illustrating a state in which the first gear and the second gear are engaged.
Figure 9:
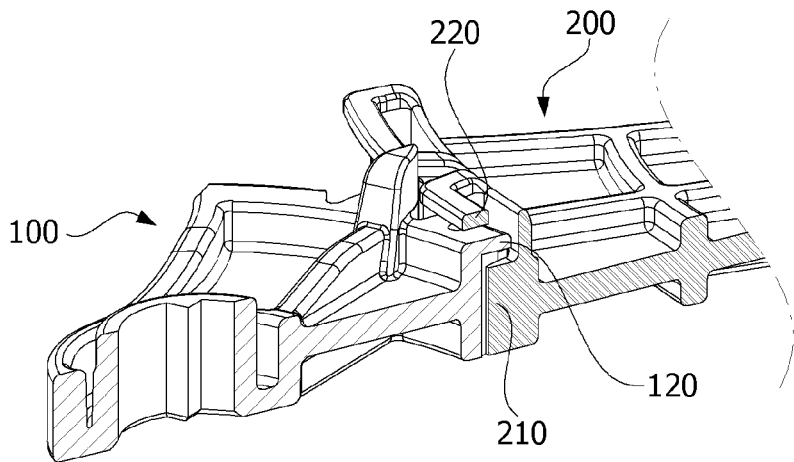
FIG. 9 is a side cross-sectional view of the first gear and the second gear in the state in which the first gear and the second gear are engaged.

FIG. 8 is a view illustrating a state in which the first gear 100 and the second gear 200 are engaged, and FIG. 9 is a side cross-sectional view of the first gear 100 and the second gear 200 in the state in which the first gear 100 and the second gear 200 are engaged.

Referring to FIGS. 8 and 9, in the state in which the first gear 100 and the second gear 200 are engaged, the first cover 120 and the second cover 220 are disposed to overlap in the axial direction. The second cover 220 is positioned outward from the first cover 120 in the axial direction. In addition, the second cover 220 is disposed to be spaced apart from the first cover 120 in the axial direction. The first cover 120 is positioned in a separation space between the second cover 220 and the second tooth 210 in the axial direction.

Since the first cover 120 covers the first tooth 110, it is possible to prevent foreign substances from being introduced between the first teeth 110. Since the second cover 220 also covers the first tooth 110, it is possible to additionally prevent foreign substances from being introduced between the first teeth 110. In addition, since the second cover 220 covers the first tooth 110 of the first gear 100, it is possible to prevent the first gear 100 from being separated from the second gear 200 in the axial direction.

Figure 10:
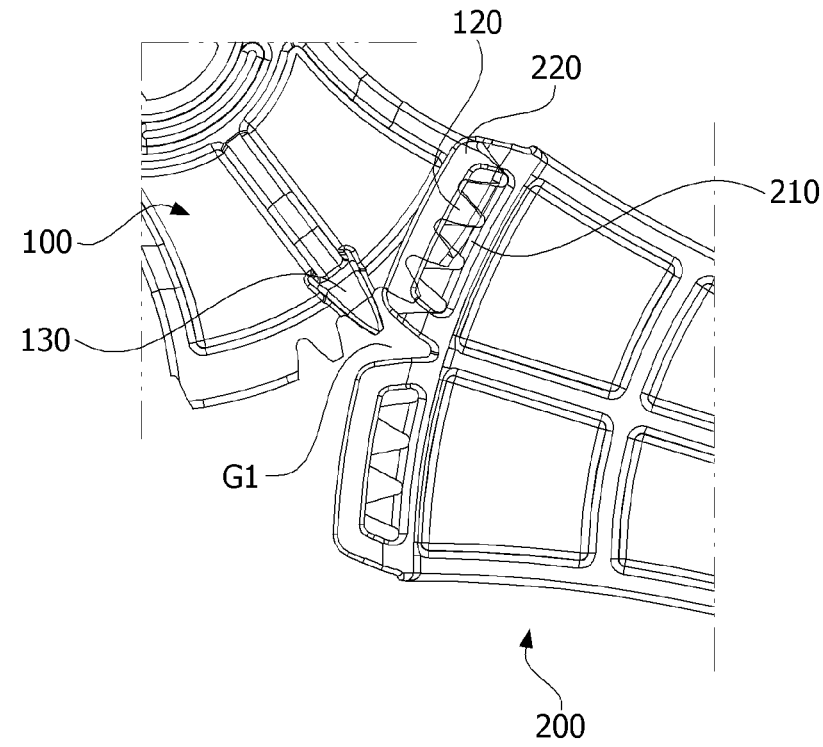
FIG. 10 is a view illustrating the first gear and the second gear in a misassembled state.
Figure 11:
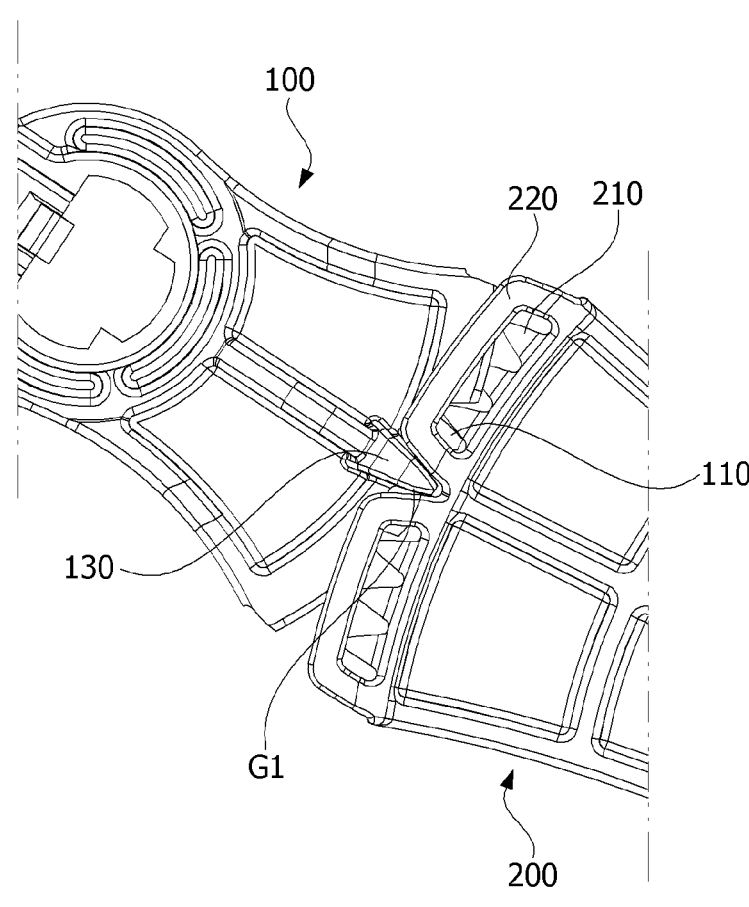
FIG. 11 is a view illustrating the first gear and the second gear in a normally assembled state.

FIG. 10 is a view illustrating the first gear 100 and the second gear 200 in a misassembled state, and FIG. 11 is a view illustrating the first gear 100 and the second gear 200 in a normally assembled state.

As illustrated in FIG. 10, when the second gear 200 is not assembled in the center area of the first gear 100 and is inserted by being biased to one side, the second tooth 210 is blocked by the first cover 120, and thus the second gear 200 may not be assembled to the first gear 100. Therefore, the second gear 200 may not be assembled to the first gear 100 when the second gear 200 is not aligned with the first gear 100.

As illustrated in FIG. 11, only when the second gear 200 is aligned in the center area of the first gear 100, the rib 130 of the first gear 100 is inserted into the first groove G1 of the second gear 200, and as the first tooth 110 and the second tooth 210 are engaged in the first area A1 of the first gear 100, the first gear 100 and the second gear 200 are assembled.

As described above, when the second gear 200 is inserted into the first gear 100 in the axial direction, the second tooth 210 of the second gear 200 is blocked by the first cover 120 when the first gear 100 and the second gear 200 are not aligned, and thus it is possible to fundamentally prevent the misassembly of the first gear 100 and the second gear 200.

According to embodiments, it is possible to physically prevent gears from being assembled by being biased to one side through a cover structure disposed on a tooth, thereby preventing the misassembly of the gears.

According to the embodiments, it is possible to prevent foreign substances from flowing into an area in which the gears are engaged through the cover structure disposed on the tooth.

According to the embodiments, by arranging a first tooth of a first gear and a second tooth of a second gear to overlap each other in an axial direction, it is possible to more effectively prevent foreign substances from flowing into the area in which the gears are engaged.

According to the embodiments, by arranging a second cover of the second gear to cover the first tooth of the first gear, it is possible to prevent the first gear from being separated in the axial direction.

The air conditioner for a vehicle according to one exemplary embodiment of the present disclosure has been described above in detail with reference to the accompanying drawings.

The above-described embodiment of the present disclosure should be understood in all respects as illustrative and not restrictive, and the scope of the present disclosure will be determined by the claims to be described below rather than the above-described detailed description. In addition, not only the meanings and scopes of the claims but also all changeable or modifiable forms derived from the equivalent concept thereof should be construed as being included in the scope of the present disclosure.

What is claimed is:

1. An air conditioner for a vehicle including a door disposed inside an air conditioning case and configured to adjust an opening degree of an air flow path, the air conditioner comprising a first gear and a second gear coupled to the door or door driving components, wherein the first gear and the second gear include a first tooth and a second tooth meshing with each other, the first gear includes a rib protruding in an axial direction and a first cover disposed above the first tooth, and the second gear includes a first groove into which the rib is inserted and a second groove into which the first cover is inserted.

2. The air conditioner of claim 1, wherein the second gear includes a second cover covering the first cover.

3. The air conditioner of claim 2, wherein the first cover and the second cover are disposed to overlap each other in the axial direction.

4. The air conditioner of claim 3, wherein the second cover is disposed to be spaced apart from the first cover in the axial direction.

5. The air conditioner of claim 2, wherein the second cover includes a hole passing through one surface and the other surface thereof in the axial direction, and the hole is disposed only in a section overlapping the first cover.

6. The air conditioner of claim 2, wherein the first tooth is formed to extend from the first cover.

7. The air conditioner of claim 2, wherein the first tooth in a second area is in contact with the first cover in the axial direction.

8. The air conditioner of claim 2, wherein the second tooth in a fourth area is disposed to be spaced apart from the second cover in the axial direction.

9. The air conditioner of claim 2, wherein an end of the second cover is disposed to protrude further than the second tooth in a radial direction.

10. The air conditioner of claim 2, wherein the second cover includes a hole passing through one surface and the other surface thereof in the axial direction.

11. The air conditioner of claim 10, wherein the hole is disposed to overlap the second tooth in the axial direction.

12. The air conditioner of claim 2, wherein the second cover is disposed to overlap the first tooth in the axial direction.

13. The air conditioner of claim 1, wherein a length of the second tooth in the axial direction is smaller than a length of the first tooth in the axial direction in a second area.

14. The air conditioner of claim 1, wherein the rib is disposed to protrude further than the first cover in the axial direction.

* * * * *